Figure 1:
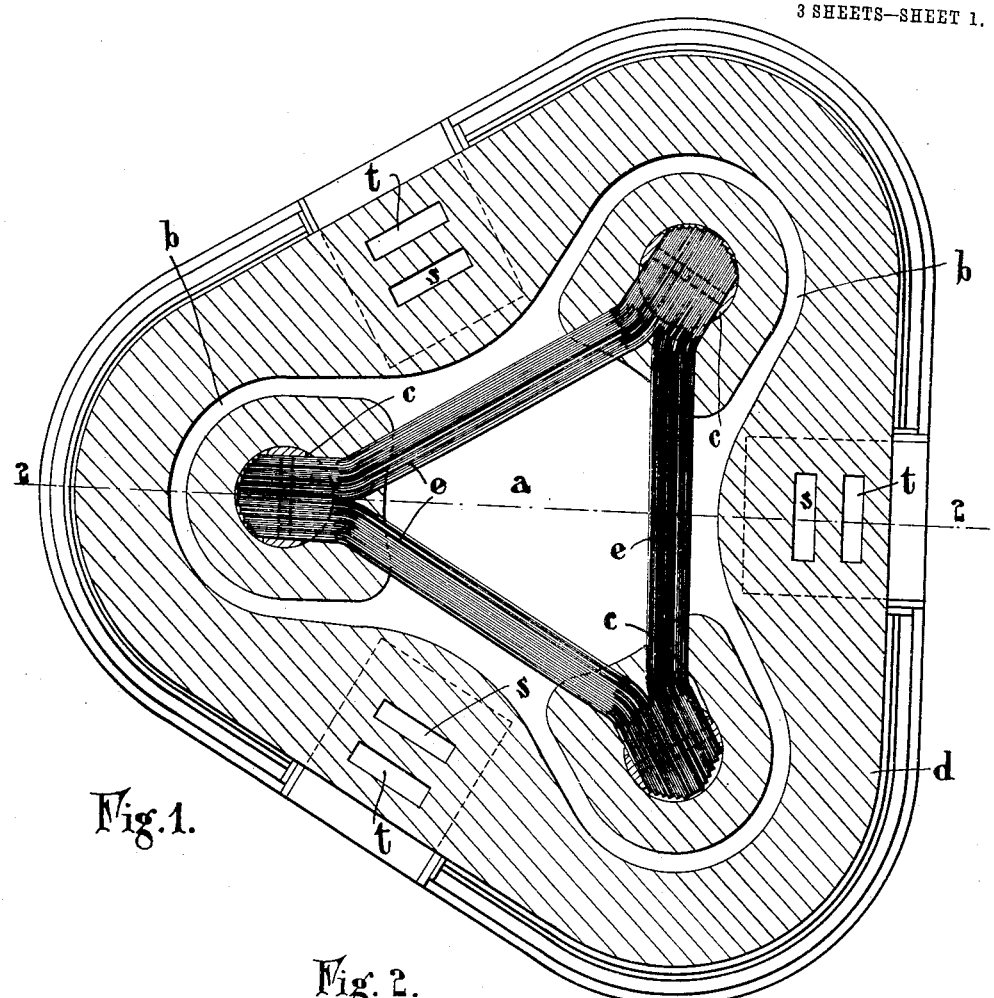

S. Z. DE FERRANTI.
METALLURGICAL FURNACE.
APPLICATION FILED APR. 7, 1908.

969,261.

Patented Sept. 6, 1910.
3 SHEETS—SHEET 1.

Attest:
Ewd L. Tolson
E. M. Sarton

Inventor,
Sebastian Ziani de Ferranti,
by Spear, Middleton, Donaldson & Spear
Att'ys.

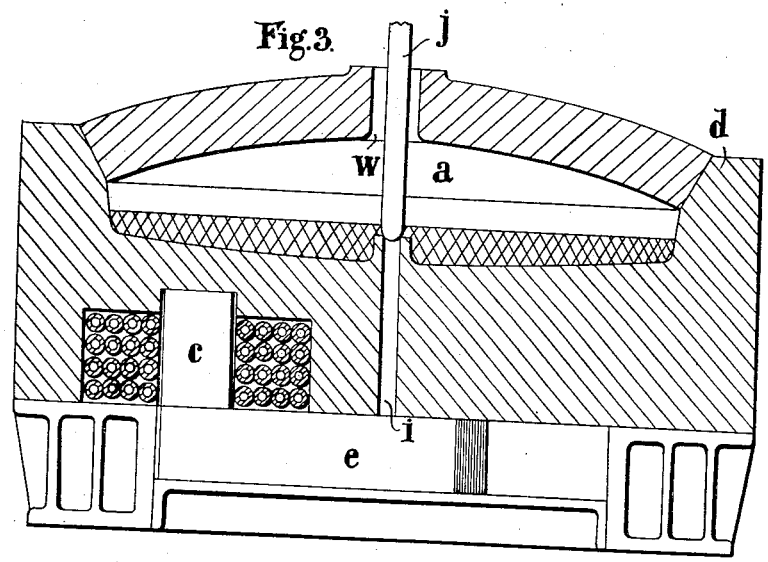
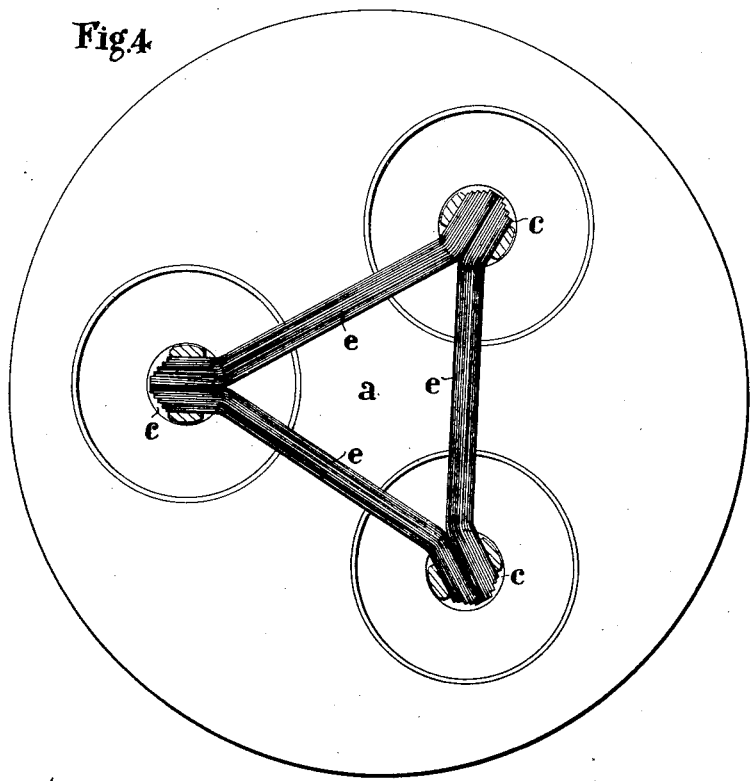

S. Z. DE FERRANTI.
METALLURGICAL FURNACE.
APPLICATION FILED APR. 7, 1908.
969,261.
Patented Sept. 6, 1910.
3 SHEETS—SHEET 3.
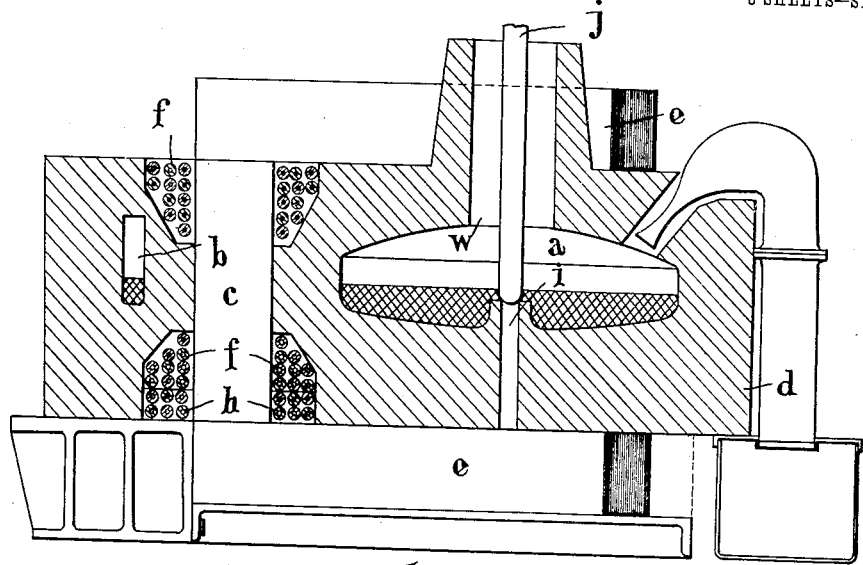
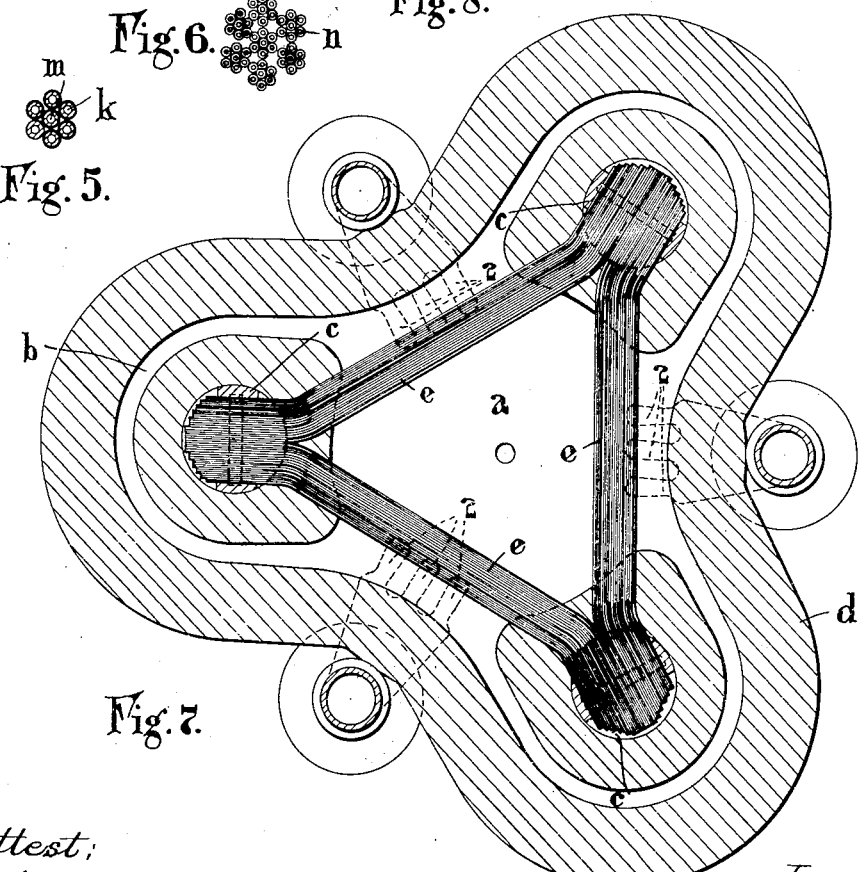
Inventor:
Sebastian Ziani de Ferranti,

UNITED STATES PATENT OFFICE.

SEBASTIAN ZIANI DE FERRANTI, OF GRINDLEFORD, ENGLAND.

METALLURGICAL FURNACE.

969,261.  Specification of Letters Patent.  Patented Sept. 6, 1910.

Application filed April 7, 1908. Serial No. 425,620.

*To all whom it may concern:*

Be it known that I, SEBASTIAN ZIANI DE FERRANTI, a subject of the King of Great Britain and Ireland, and residing at Grindleford, in the county of Derby, England, have invented certain new and useful Improvements in Metallurgical Furnaces, of which the following is a specification.

The invention relates generally to metallurgical processes involving the use of electric furnaces and has special reference to improved means for producing steel.

It is well known at the present time that steel varies considerably in quality according to the process of manufacture employed in its production. Thus for example, Bessemer steel is in general inferior in quality to that manufactured by the Siemens open hearth process owing, it is supposed to the inclusion or occlusion in its substance of minute bubbles of gas on the other hand, although the method of manufacturing Siemens open hearth steel overcomes this objection to a large extent, it has nevertheless the disadvantage of requiring a much longer time for its production.

Now the primary object of the present invention is to provide means for making the best quality steels in less time and at a less cost than is now possible.

The processes of steel making at present in use commercially on a large scale all involve the production of heat by means of chemical combustion, in some cases gases being combined with an oxidizing agent to form a flame which plays on the surface of the metal while in other cases an oxidizing or other active agent either in the form of a gas or otherwise combines with impurities in the metal itself. All such exothermic chemical reactions or combinations of the same I shall refer to broadly hereinafter as "chemical combustion." In such processes it appears probable that the economic limit of supply of heat units per unit weight of material in a given time has been reached so that in order to bring about an acceleration of the rate of production electrical methods have been proposed for supplying additional heat. I believe, however, that a mere increase of the supply of heat though proportionately beneficial, is of comparatively small value in accelerating the processes concerned unless the metal under treatment is at the same time actively and vigorously mixed or circulated, so as to bring it into intimate contact with the various reagents. So far as I know the only practical method of securing such an active circulation in a large body of metal is by driving the metal positively in a manner similar or analogous to that in which the moving part of an electric motor is driven; such a method may involve the actual passage of current through the metal itself or alternatively circulation of the metal may be brought about inductively. In most cases, however, I prefer the latter method both for heating and mixing as all difficulties connected with the electrodes are thereby immediately overcome.

To secure the above objects the present invention consists in the improved furnaces hereinafter described, the novel feature of which are more particularly pointed out in the claims.

I find that a great advantage arising from my improved furnace lies in the fact that the various steps of any process carried out therein are under complete control and can be readily modified to suit special cases, as will be explained more in detail hereinafter. Moreover, where subsequently to the chemical treatment, I vigorously circulate the metal, I find that burned particles, bubbles or the like are mechanically separated out so that a steel of great homogeneity and purity is obtained.

Figure 2:
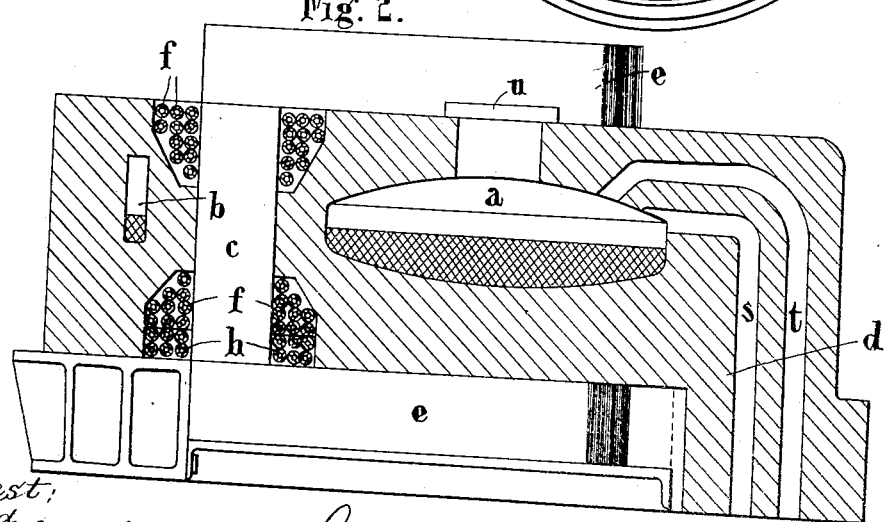

Referring to the accompanying drawings which form part of the specification; Figure 1 shows a plan view of a Siemens regenerative furnace according to my invention; Fig. 2 showing a corresponding section on the line 2—2 of Fig. 1; Figs. 3 and 4 show views of a modified form of furnace in which the magnetic cores do not pass through the bath; Figs. 5 and 6 show different sections of hollow energizing coils, while Figs. 7 and 8 show respectively a sectional plan and elevation of a form of electric furnace provided with nozzles for surface blowing.

The drawings throughout are of a diagrammatic or conventional nature only and are not intended to show such working details as are common knowledge to those skilled in the art.

I may carry the invention into effect according to various forms. Thus, so far as concerns the electrical features of the necessary apparatus, I preferably operate on the two or more phase principle and arrange the magnet cores to thread through a common bath of metal (though in some cases each magnetic circuit may be complete in itself) and to be connected together by suitably laminated members at each end in one or more groups of any suitable number of cores as required. I may energize these cores whether as constructed above or in any other suitable manner by coils wound around a part of them, say that part below the bath, so as to produce a large leakage rotary or shifting field through the bath disposed so as to rotate or mix the metal. I may also arrange coils above the bath as well as below so as to produce a symmetrical field and thus give a heating effect only or again I may arrange special heating coils in the plane of the bath. These coils however arranged, I connect to suitable switches or controlling gear, so that they may at will be used for heating with or without mixing or mixing with slight heating.

According to the specific arrangement shown by way of example of my invention in Figs 1 and 2, I apply certain of the electrical arrangements described above to a Siemens regenerative furnace.

The furnace proper or bath, $a$, I construct of circular form in the main or central portion and I provide it with three auxiliary channels, $b$, of comparatively small section in communication with the central portion and surrounding the corresponding limbs, $c$, of the magnet, these limbs connected above and below the furnace body, $d$, by suitable laminated members, $e$, in a manner similar to that described in the specifications of my British Patents Nos. 13949 and 13949A of 1906. On the limbs, $c$, of the three phase arrangement shown, I wind coils, $f$, above and below the furnace bath in the corners of the encircling magnets so that the turns of the coils are roughly in the form of a double cone, (which may have a hollow contour in some cases) with the furnace bath disposed in part in the angular spaces between the cones. I provide additional coils, $h$, as shown in the lower parts of the magnet limbs, so that the unsymmetrical field produced may rotate or mix the material acted upon. Or I may modify the furnace as shown in Figs. 3 and 4 so that the magnetic cores do not pass through the bath; in such a case effective mixing is obtained with only a slight amount of heating. By means of such arrangements provided with suitable controlling gear, I may heat the bath electrically with or without mixing.

When I rotate the metal by two or more phase current as above described, or in any other manner, I may take advantage of the hollow formed in the center by centrifugal force and provide a duct such as $i$, (with a stopper $j$) at this point through which I may draw off the spent slag formed in the process.

The energizing coils should be hollow so that a cooling fluid may be circulated through them. Such coils may, as indicated in the figures, be of the type described in my patent specifications above mentioned, but I prefer to construct them of a large number of small hollow tubes. These tubes may be arranged with regard to one another in any suitable manner and be connected in parallel as regards the flow of cooling fluid through them but I prefer to twist them together after the manner of the strands of a rope or I may merely bundle them together without twist, in either case arranging suitable insulation between the individual coils.

The arrangements I prefer are shown in Figs. 5 and 6 the outer strands, $k$, in the first case being arranged at the same distance from the center strand $m$, while in the second case, the individual strands are themselves built up of sub-strands, $n$, so that the mean distances of each group of substrands from the center are equal. Such arrangements may obviously be modified in a large number of ways, the object being to divide the conductor into a large number of members so as to prevent re-distribution of the currents in the conductors and to save currents induced in the copper mass by leakage.

Returning now to the description and action of the furnace itself, the central body of the bath is violently rotated by the leakage field thus inducing a flow around the subsidiary channels, $b$, which are intensely heated electrically on account of their small section; the entire mass is thus caused to pass continually through the channels, $b$, and in conjunction with the gas heating or heat developed by the chemical combinations of the blast to be quickly raised to a high temperature, the heating being conducted beneath a chemically active slag into contact with which the metal is continually brought.

The gas and air ducts connecting the furnace to the usual regenerators are indicated at $s$ and $t$, respectively, the necessary valves and other fittings for controlling the working of the furnace being of usual construction. A charging door, $u$, is also indicated.

When a hot blast under pressure is used in place of the regenerators, I prefer to employ hot blast stoves such as are used for the hot blast for blast furnaces. Such stoves may be heated regeneratively if desired and should be constructed to stand the high pressure of the blast.

According to a modification of my invention I may apply any of the known forms of surface blowing to electric induction furnaces of the type described, for example, in the specifications of my British Patents Nos. 700 of 1887 and 13949 and 13949^A of 1906. Thus in carrying this part of the invention into effect according to one form (see Figs. 7 and 8) I use an electric induction furnace, $a$, of the type shown in Figs. 1 and 2 having limbs, $c$, energized by coils, $f$, and I arrange in connection with this furnace a system of high pressure jets issuing from nozzles, 2, preferably of the expansion type to act upon the surface of the metal so as thoroughly to churn and mix it. These jets may be either oxidizers to burn out impurities such as carbon and silicon from the iron or they may be used to force suitable reagents, such as ore or lime, into the mass of the rotating metal. Or again in other cases the jets may consist of an inert gas adapted merely to mix the metal and reagents or of a reducing gas. These nozzles preferably act obliquely on the surface of the bath so as to increase the churning, rolling or mixing action and to rotate the metal if in an annular vessel.

In some cases I discharge combustible preferably of a gaseous nature and air from closely adjoining nozzle systems so that combustion takes place on the surface of the metal. Or a hot blast may be discharged from a combustion chamber, the gas falling to the minimum temperature at exit. In either case the kinetic energy of the gas appears in the form of heat on the surface of the metal. When the carbon or other impurity is burned out I stop the jets and add the required amount of carbon to convert the mass into steel subsequently mixing with or without electric mixing and preferably finishing the process by a final period of electric heating. I may use the jets of an inert gas to assist in the mixing. My object in the latter part of the process is to insure a very thorough mixing of the metal out of contact with air, the slag forming a protective layer and thus free the metal from the defects involved by the prior purifying or other process. Such a process is particularly applicable to the production of steel of a uniformly high quality. The blowing may be effected in an ordinary Bessemer converter the metal being subsequently treated by electric heating and mixing in the manner described, but I do not consider this process the best. In every case the force producing the electric rotation will contribute a fair amount of heat to the metal which will act beneficially in the process.

I wish it to be understood that I may employ electric mixing after the addition not only of carbon but of any alloy forming material or of any reagent added with the object of freeing the charge of foreign matter, gaseous liquid or solid.

I will now give certain examples of novel processes which can be carried out by means of the furnaces hereinbefore described or by any other having the same essential characteristics. I will first describe an intermittent acid process with separate complete heats for working iron with very low phosphorus and sulfur and high in carbon manganese and silicon. I first fill the bath of the electric furnace with a charge of molten pig taken from the mixer or from the blast furnace direct. I then electrically heat and mix the charge or give so much electric heating as the material requires but I prefer the full electric heating as I thus secure the best result. I then add iron ore and start the blast from the nozzles above the bath and blow with air or flame with excess of air so as to drive in oxid which is thus churned up with the metal by the blast and electric mixing. The oxygen in the blast at the same time acts on the metal. The heat produced by the chemical reaction and the electric current is very great and as the mixing is most complete the impurities are rapidly oxidized. The metal being spun around by the leakage field piles up on the sides and its surface assumes a dish form. In this dish so formed the reaction takes place thus saving the walls of the furnace from the action of the slag. As soon as CO is given off the blast may consist of air only so as to oxidize it to $CO_2$. The metal may have carbon added for example in the form of spiegel. Instead of pouring immediately, as in the Bessemer process, the metal may be kept in the furnace to be further heated and mixed and only poured after sufficient treatment, such as the addition of an allow. The effect of this operation of heating and rotating is to free the metal from occluded gas, burned particles and slag. Scrap may be used in this process to any desired extent.

As a modification of the above process, the oxidation of the impurities may be carried out by an oxidizing blast alone, the process otherwise being the same as that described.

When oxid and scrap are used, in place of the blast blowing through the slag from the nozzles, heat may be supplied at the same time as the electric heating and mixing by means of flame formed from gas and air supplied through regenerators as in the ordinary open hearth process. The metal is finished by electric heating and mixing. The first method described is however the best, as it is much the most rapid, is more economical in the weight of steel returned and is more economical in fuel owing to the short time occupied in producing a high-class product.

According to another process, I can work iron high in phosphorus in the following manner. The bath of the furnace (such as described herein) is first lined with a basic or neutral material and is then filled from a mixer or direct from the blast furnace with molten pig which is electrically heated and rotated. When it is desired to first remove the phosphorus in a highly phosphoric slag the temperature is kept fairly low. Lime stone and iron ore are then introduced to form a highly basic slag which is blown into the body of the rotating metal by means of an inert or flame blast from nozzles above the bath. The slag is removed by siphoning from the centrifugally formed well in the center of the bath as formed additional ore and lime stone being added and removed until the metal has been sufficiently purified of phosphorus. Further, ore limestone and scrap may then be added; the blast is changed into an oxidizing one and the metal is then mixed with the slag and finally free of impurities and by preference blown right down. Carbon in any convenient form and to the desired extent may then be added. The metal is then electrically rotated and so subjected to the centrifugal separation from any remaining slag, occluded gas or oxid. It is then ready for pouring.

The above method may be modified by powdering the iron ore and limestone and blowing it in continuously by the blast, the spent slag being removed as formed as before described. This process may also be worked with a low pressure flame as in the ordinary open hearth process instead of as above described with a pressure blast issuing from properly shaped nozzles and driving through the slag and into the body of the metal. The process is then much quicker than the open hearth, as the electric mixing coupled with the higher temperature obtained by the combined heating enables the action to go on much more rapidly. The final electric treatment is also very beneficial. This modification is not however, so advantageous as the method of basic working first described in which the most intimate mixing at the highest temperature is practiced. I may also carry out both the acid and the basic processes starting with only a half or third charge of molten iron and adding unmelted pig and scrap, I then prefer to use flame and electric heating. After melting, the process will follow according to the general scheme already described. A portion of the finished charge may be left to start the next heat. If in the basic process the iron used has only a moderate amount of phosphorus so that only a small amount of heat results from its combination, the additional heat necessary is supplied electrically. The electric heating also enables a high temperature to be obtained at any time in the process of steel making and finishing, thus supplying the necessary quantity for making these processes effective.

Or the ordinary method of treating the bath of metal with an oxidizing blast as in the Bessemer process may be employed, the material difference being that the high pressure blast acts from above and is coupled with electric heating and mixing. The carbon silicon and manganese are principally first removed and then the phosphorus. The final steps of the process are as before.

Although I have described above certain specific forms of my invention I wish it to be understood that these are by way of example only and are not to be taken as limiting the scope of the broader features of my invention as defined in the earlier portion of this specification and in the claims.

Having thus described my invention what I claim as new and desire to secure by Letters Patent is:—

1. In combination, furnace walls inclosing a bath of metal; a plurality of reëntrant metal-containing ducts communicating with said bath and a plurality of gas ducts, said metal-containing ducts and said gas ducts being alternately spaced around said bath.

2. In combination, a receptacle containing a bath of metal; magnet cores operatively spaced around said bath together with gas ducts alternately disposed with said magnet cores.

3. In combination, furnace walls inclosing a bath of metal; magnet cores spaced around said bath at the angles of a polygon; end-pieces connecting said cores, said end-pieces themselves corresponding with the sides of said polygon together with an outlet duct from said bath disposed within the area of said polygon and means for closing said duct.

4. In combination, a receptacle for the material to be treated; means for heating the same by chemical combustion, together with means for inductively mixing said material, said mixing means including magnet cores spaced around said bath and polygonally disposed end-pieces connecting the same.

5. In combination, a receptacle for the material to be treated; means for treating said material with a system of gaseous jets together with means inductively disposed in relation to said material for stirring the same during said jet treatment, said mixing means including magnet cores polygonally disposed around said bath.

6. In combination, a receptacle for the material to be treated; a plurality of twyers operatively disposed in relation to said receptacle and electromagnetic means for imparting heat to said material, said means including members spaced alternately with said twyers.

7. In combination, a receptacle for the material to be treated; means for heating the same by chemical combustion together with electromagnetic means for imparting additional heat to said material, said means acting likewise to inductively mix said material.

8. In combination, a receptacle for the material to be treated; twyer means for impinging gas on said material to purify the same, and means inductively disposed in relation to said receptacle to mix said material during the purifying treatment.

In testimony whereof, I affix my signature in presence of two witnesses.

SEBASTIAN ZIANI DE FERRANTI.

Witnesses:
  A. H. THOMPSON,
  WM. FAVIT.